United States Patent [19]

Wunderlich

[11] 4,193,481
[45] Mar. 18, 1980

[54] DRAG FREE SLIDING CALIPER DISC BRAKE BUSHING

[75] Inventor: Langley H. Wunderlich, Dayton, Ohio

[73] Assignee: General Motors Corporation, Detroit, Mich.

[21] Appl. No.: 927,855

[22] Filed: Jul. 25, 1978

[51] Int. Cl.² ............................................. F16D 65/54
[52] U.S. Cl. ................................ 188/71.8; 188/73.3; 188/196 P; 277/11; 277/27
[58] Field of Search ................ 188/71.7, 71.8, 72.1, 188/72.3, 72.4, 73.3, 196 P; 267/153; 277/9.5, 11, 27; 285/DIG. 11, DIG. 19; 251/DIG. 1; 308/238; 92/165 R, 168

[56] References Cited

U.S. PATENT DOCUMENTS

| 3,202,410 | 8/1965 | Schell | 267/153 |
| 3,628,639 | 12/1971 | Daley | 188/73.3 |
| 3,738,665 | 6/1973 | Bilco | 277/27 |
| 3,746,348 | 7/1973 | Stone | 277/11 |
| 4,058,084 | 11/1977 | Kawaguchi et al. | 188/71.8 |

FOREIGN PATENT DOCUMENTS 2326047 12/1973 Fed. Rep. of Germany ....... 188/196 P

*Primary Examiner*—Edward R. Kazenske
*Attorney, Agent, or Firm*—D. D. McGraw

[57] ABSTRACT

A caliper housing is slidably mounted on support pins with rubber-like bushings. Each bushing is compressed in a housing groove when the disc brake is actuated to move the housing in the brake apply direction. The bushing has a toroidal main body and a series of circumferentially spaced axially extending protrusions. The main body grips the cylindrical surface of a pin in slip-stick relation. Upon brake actuation the protrusions are compressed. Upon brake release they return to their original configuration, moving the housing on the pins in the release direction to provide zero brake drag of the brake shoes on the disc. The bushing main body slips relative to the pins only when sliding movement of the caliper housing during brake actuation is sufficient to require adjustment of the brake release position of the caliper housing relative to the support pins.

4 Claims, 4 Drawing Figures

DRAG FREE SLIDING CALIPER DISC BRAKE BUSHING

The invention relates to a bushing in a drag-free sliding caliper disc brake, and more particularly to one which provides for releasing movement of the sliding caliper in an amount sufficient to assure no brake shoe drag on the brake disc, and also permits adjustment of the brake release position of the caliper housing as the brake linings wear.

It is a particular feature of the invention to provide an annular resilient rubber-like bushing having a toroidal main body and a series of circumferentially spaced resilient protrusions extending from the main body along axes lying in a formation defined by a surface of revolution generated about the center axis of the toroidal main body. It is another feature of the bushing embodying the invention that the protrusions have a smaller transverse thickness than the transverse thickness of the toroidal main body. A more particular feature of the bushing embodying the invention is that the surface of revolution on which the axes of the protrusions lie also passes through the annular axis of the toroidal main body. In the particular bushing shown and described herein, the surface of revolution on which the protrusion axes lie is a right circular cylindrical surface. It is also recognized and contemplated that the surface of revolution could be of other formation, as for example conical, spheroidal or paraboloidal.

IN THE DRAWINGS

Figure 1:
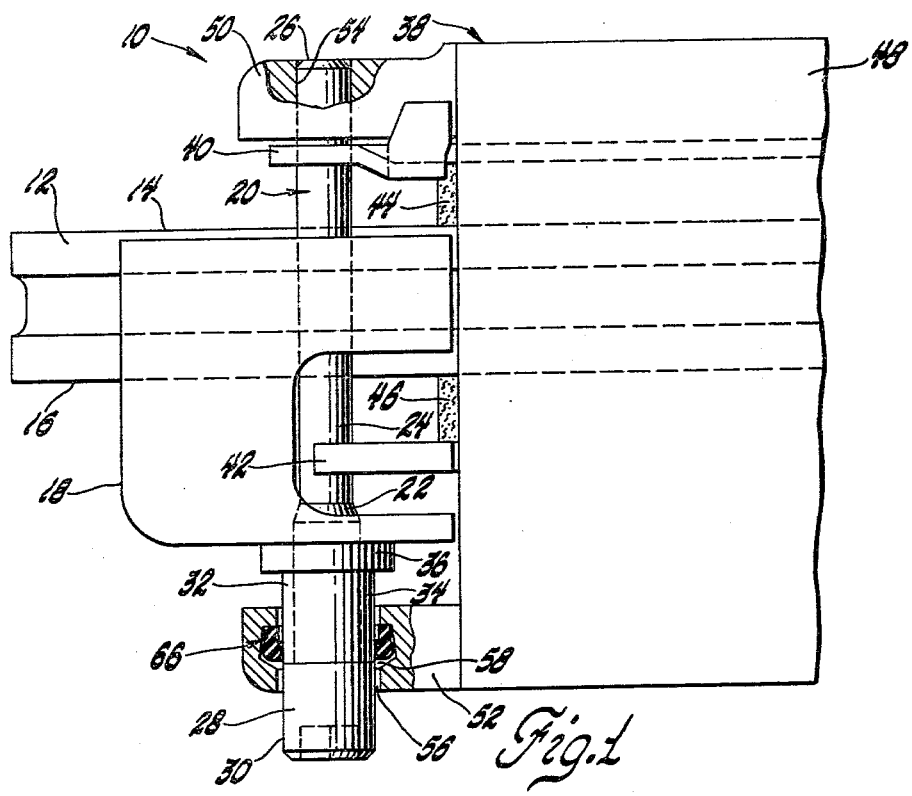
FIG. 1 is a plan view of a portion of a sliding caliper disc brake assembly having parts broken away and in section and illustrating the invention.

The disc brake assembly 10 is of the sliding caliper type exemplified by the brake which is the subject of U.S. Pat. No. 3,628,639, patented Dec. 21, 1971 and entitled "Disc Brake Caliper Mounting Means". The disc brake assembly includes a disc 12 which is attached to a vehicle wheel for rotation therewith and has oppositely disposed friction braking surfaces 14 and 16. A support bracket 18 is suitably secured to a fixed portion of the vehicle to support the disc brake caliper and to transmit braking torque. A pair of support pins or bolts are secured to the support bracket 18, one such support pin 20 being illustrated. Pin 20 extends parallel to the axis of disc 12 and across the disc periphery. An intermediate portion 22 of the pin may be threaded into a portion of the support bracket 18, for example, to secure the pin in place. The pin shank 24 extending across the periphery of disc 12 terminates in a pin end 26. The pin may be formed as a bolt with the other pin end being a bolt head 28. The particular pin illustrated has the head formed with a smooth cylindrical outer surface 30 and a recessed socket formed in the head to provide for pin installation and removal. The head is axially spaced from the intermediate portion 22 and a sleeve 32 fits over the portion of the pin shank between intermediate portion 22 and head 28. Sleeve 32 has an outer cylindrical surface 34 which is effectively an extension of the bolt head surface 30. One end of sleeve 32 bears against the inner side of the bolt head 28 and the other end bears against a bearing member 36 which also engages one side of support bracket 18. This general type of construction is disclosed in the above noted patent, particularly insofar as the use of a sleeve is concerned.

The disc brake assembly 10 includes a caliper assembly 38. This assembly includes a suitable piston, not shown, for brake actuation, and brake shoe assemblies 40 and 42. The lining 44 of brake shoe assembly 40 is positioned to engage disc surface 14 in braking relation, and the lining 46 of shoe assembly 42 is arranged to engage disc surface 16 in braking relation, with the disc brake assembly actuated. It is also desirable to have these linings present no drag whatsoever on the disc when the brake is released. By providing a drag-free disc brake, the life of the brake linings is extended and less energy is utilized than would be the case if the linings engaged the disc surfaces during brake release.

The caliper assembly 38 includes a caliper housing 48. The housing extends across the periphery of disc 12 and radially inwardly to some extent on either side of the disc. Since the caliper assembly is of the sliding caliper type, housing 48 is provided with suitable piston means on one side of disc 12 for actuation of the brake assembly by pressure. Although no piston means is illustrated, such an arrangement is well known. See the above noted patent, for example. The caliper housing has a pair of ears at each end thereof, the ears 50 and 52 being illustrated. These ears are respectively provided with axially aligned openings 54 and 56 which receive the support pin 20. A similar arrangement is provided on the other end, not shown, of the caliper housing in accordance with the general arrangement found in the above noted patent.

Opening 56 is somewhat larger in diameter than the outer cylindrical surface 34 of sleeve 32 and surface 30 of pin head 28. In the preferred embodiment, a groove 58 is formed within opening 56 in ear 52. The groove 58 has a bottom wall 60 and side walls 62 and 64. The groove is open toward surface 34 of sleeve 32. It will be understood that in some instances it may be desirable to provide groove 58 in a part of the support pin assembly such as sleeve 32 or head 28. This general arrangement is shown for one of the bushings in U.S. Pat. No. 3,917,032, for example. In that patent, issued Nov. 4, 1975, the sliding caliper is mounted on a single pin.

Figure 2:
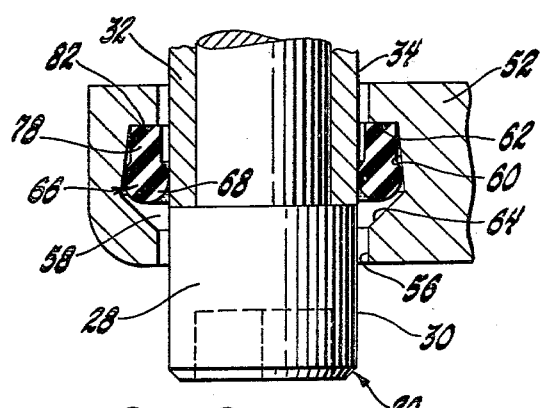
FIG. 2 is a fragmentary view of a portion of the assembly of FIG. 1, with parts broken away and in section and illustrating the invention in greater detail.

While pin end 26 is illustrated as being slidably fitted in opening 54, in some instances the same construction illustrated in FIGS. 1 and 2 may be used when desired. In other instances, different bushing arrangements may be used in ear 50.

Figure 3:
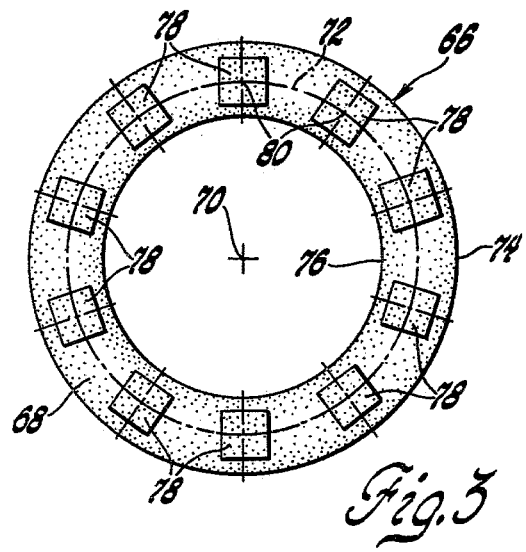
FIG. 3 is a plan view of the bushing embodying the invention.
Figure 4:
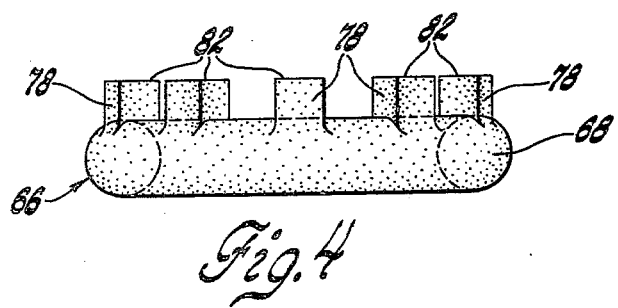
FIG. 4 is an elevation view of the bushing embodying the invention.

The bushing 66 is illustrated in greater detail in FIGS. 3 and 4. It is annular and is made of a suitable rubber-like material so that it is resilient and has appropriate frictional and sliding characteristics. Bushings, O-rings and seals of such materials are well known. Bushing 66 has a toroidal main body 68 formed about a center axis 70 and having an annular axis 72. The bushing main body 68 is illustrated as having a circular cross section, although other cross sections may be used. The thickness of the bushing main body 68 from the body outer periphery 74 to its inner periphery 76 is preferably greater in its free condition than is the radial distance between the maximum depth of the groove bottom wall 60 and the sleeve surface 34. Therefore the bushing main body is squeezed between the groove bottom wall 60 and the sleeve surface 34 to provide a tight bushing fit while allowing the bushing to slip relative to the sleeve surface 34 under conditions to be described.

The bushing has a series of circumferentially spaced resilient protrusions 78 integrally formed with the main body and extending from the main body in an axial direction. The protrusions 78 have axes 80 which lie in a formation defined by a surface of revolution generated about the center axis 70 of the toroidal main body 68. In the preferred form illustrated, the surface of revolution containing axes 80 also passes through the annular axis 72 of main body 68. Furthermore in the preferred embodiment illustrated the surface of revolution is a right circular cylindrical surface. The protrusions 78 are illustrated as being substantially square in cross section and having a transverse thickness which is less than the transverse thickness of the toroidal main body 68. The protrusions may have other cross section forms. The protrusions terminate at their outer ends in flat surfaces 82. When the bushing is installed in groove 58, these end surfaces 82 engage the groove side wall 62 as seen in FIG. 2.

It can be seen that when the caliper housing 48 moves in the brake actuating direction to engage brake shoe lining 44 with surface 14 of disc 12, the groove side wall 62 will axially compress the protrusions 78. If no adjustment is required due to lining wear, the bushing main body 68 will remain in gripping position on the surface 34 of sleeve 32. If such adjustment is required, the force of brake actuation will cause the bushing to slip and then stick to or grip sleeve 32 in a sliding adjusted position. Upon brake release the protrusions 78 will expand axially and move the caliper housing 48 relative to pin 20 and support member 18 in the brake releasing direction until there is no brake drag of shoe lining 44 on disc 12. As is well known in the art, other suitable arrangements are made to be sure that brake lining 46 does not drag on disc 12 during brake release. For example, a retracting seal may be used in conjunction with the brake piston. However, the particular arrangement for assuring that there is no brake drag by brake lining 46 is not a part of this invention.

It is also recognized that the bushing 66 may in some instances be operable as a seal. For example the bushings in the above noted U.S. Pat. No. 3,917,032 also act as seals. Therefore the term bushing as used herein and in the claims is considered to encompass a seal construction.

What is claimed is:

1. In a drag-free sliding caliper disc brake having
a cylindrical support member;
a caliper housing member having a cylindrical opening therethrough through which said support member extends;
one of said members having a groove formed therein defined by a bottom wall and side walls and opening toward the other of said members within said cylindrical opening; the improvement comprising:
an annular resilient rubber-like bushing received in said groove, said bushing having a toroidal main body engaging said groove bottom wall and the cylindrical surface of said other member in a grip-slip relation, said bushing having a series of circumferentially spaced resilient protrusions extending from said main body in an axial direction and normally engaging one of said groove side walls and radially spaced from said other member so as to have no radial loading thereon;
said bushing protrusions being axially compressed upon brake actuation by sliding movement of said caliper housing member relative to said support member in the brake actuating direction, said bushing protrusions upon brake release expanding axially and moving said caliper housing member relative to said support member in the brake releasing direction until there is no brake drag, said bushing main body slipping relative to said other member during brake actuation only when the sliding movement is sufficient to require adjustment of the brake release position of said caliper housing member relative to said support member.

2. A bushing assembly comprising:
concentric radially spaced inner and outer sleeve members subject to axial relative movements during normal usage, one of said sleeve members having a groove therein defined by a bottom surface and side walls and opening toward the other of said sleeve members; and
an annular resilient rubber-like bushing having a toroidal main body and a series of circumferentially spaced resilient protrusions extending from said main body along axes lying in a formation defined by a surface of revolution generated about the center axis of said toroidal main body, each of said protrusions having a smaller transverse thickness than the transverse thickness of said toroidal main body, said protrusions having free ends remote from said toroidal main body engageable with one of said groove side walls, said protrusions being normally radially spaced from said groove bottom surface and the surface of the other of said sleeve members so as to have no radial loading thereon, said toroidal main body engaging said groove bottom surface and the surface of the other of said sleeve members and engageable with the other of said groove side walls, said protrusions acting as compression springs and storing energy upon relative movement of said sleeve members in one axial direction and releasing the stored energy to at least assist in causing relative movement of said sleeve members in the opposite axial direction, said toroidal main body resistably slipping axially relative to the surface of the other of said sleeve members only when relative axial movement of said sleeve members in the one axial direction is sufficient to cause such slipping.

3. A bushing assembly comprising:
concentric radially spaced inner and outer sleeve members subject to axial relative movements during normal usage, one of said sleeve members having a groove therein defined by a bottom surface and side walls and opening toward the other of said sleeve members; and
an annular resilient rubber-like bushing having a toroidal main body and a series of circumferentially spaced resilient protrusions extending from said main body along axes lying in a formation defined by a surface of revolution generated about the center axis of said toroidal main body and passing through the annular axis of said toroidal main body, each of said protrusions having a smaller transverse thickness than the transverse thickness of said toroidal main body, said protrusions having free ends remote from said toroidal main body engageable with one of said groove side walls, said protrusions being normally radially spaced from said groove bottom surface and the surface of the other of said sleeve members so as to have no radial loading thereon, said toroidal main body engaging said groove bottom surface and the surface of the other of said sleeve members and engageable with the other of said groove side walls, said protrusions acting as compression springs and storing energy upon relative movement of said sleeve members in one axial direction and releasing the stored energy to at least assist in causing relative movement of said sleeve members in the opposite axial direction, said toroidal main body resistably slipping axially relative to the surface of the other of said sleeve members only when relative axial movement of said sleeve members in the one axial direction is sufficient to cause such slipping.

4. A bushing assembly comprising:

concentric radially spaced inner and outer sleeve members subject to axial relative movements during normal usage, one of said sleeve members having a groove therein defined by a bottom surface and side walls and opening toward the other of said sleeve members; and an annular resilient rubber-like bushing having a toroidal main body and a series of circumferentially spaced resilient protrusions extending from said main body along axes lying in a formation defined by a right circular cylindrical surface of revolution generated about the center axis of said toroidal main body and passing through the annular axis of said toroidal main body, each of said protrusions having a smaller transverse thickness than the transverse thickness of said toroidal main body, said protrusions having free ends remote from said toroidal main body engageable with one of said groove side walls, said protrusions being normally radially spaced from said groove bottom surface and the surface of the other of said sleeve members so as to have no radial loading thereon, said toroidal main body engaging said groove bottom surface and the surface of the other of said sleeve members and engageable with the other of said groove side walls, said protrusions acting as compression springs and storing energy upon relative movement of said sleeve members in one axial direction and releasing the stored energy to at least assist in causing relative movement of said sleeve members in the opposite axial direction, said toroidal main body resistably slipping axially relative to the surface of the other of said sleeve members only when relative axial movement of said sleeve members in the one axial direction is sufficient to cause such slipping.

* * * * *